G. BRAZEE.
SIGNAL DEVICE FOR AUTOMOBILES.
APPLICATION FILED MAR. 3, 1917.

1,252,655.

Patented Jan. 8, 1918.

Inventor
George Brazee
By C. D. Haskins
Attorney

UNITED STATES PATENT OFFICE.

GEORGE BRAZEE, OF SEATTLE, WASHINGTON.

SIGNAL DEVICE FOR AUTOMOBILES.

1,252,655.

Specification of Letters Patent. Patented Jan. 8, 1918.

Application filed March 3, 1917. Serial No. 152,416.

*To all whom it may concern:*

Be it known that I, GEORGE BRAZEE, citizen of the United States, residing at Seattle, in the county of King and State of Washington, have invented a certain new and useful Improvement in Signal Devices for Automobiles, of which the following is a specification.

My invention relates to improvements in signaling devices for automobiles, and the object of my invention is to provide a simple and efficiently operative signaling device which shall be adapted to be clamped to one of the vertical supports of the wind shield of an automobile and which shall be further adapted to be actuated by the operator at required times to move it to a position that will indicate that the course of said automobile in its travel is about to be changed.

A further object of my invention is to provide a signaling device having a hollow semaphorical arm of arrow-like form which shall be adapted to be moved from a vertical position to a horizontal position and which hollow arm shall embody a front side wall of red glass and a rear wall of glass of a different color, together with an incandescent electric lamp operatively disposed within it in such manner that the light of said lamp may illuminate both of said glass walls only when said arm is in a horizontal position thus to display an arrow that may be seen from points in front of said arm and an arrow of a different color that may be seen from points in the rear of said arm.

I accomplish these objects by devices illustrated in the accompanying drawings, wherein—

Figure 1:
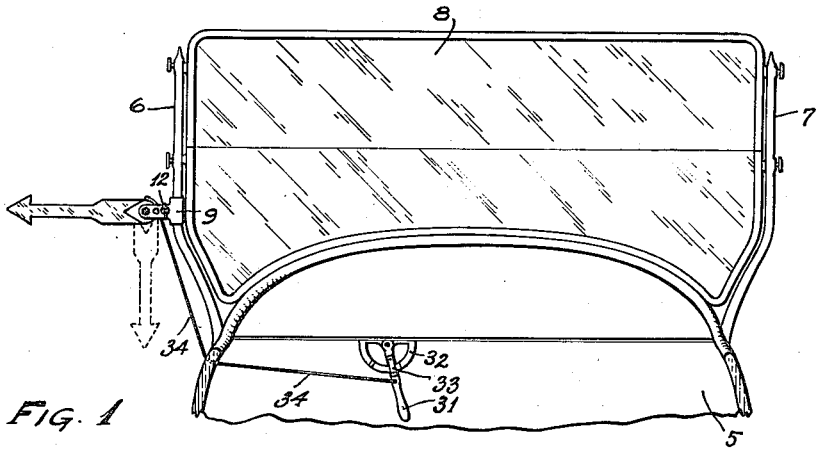
Figure 1 is a view in rearward elevation of a wind shield and dash board of an automobile to which is attached a signaling device embodying my invention.
Figure 2:
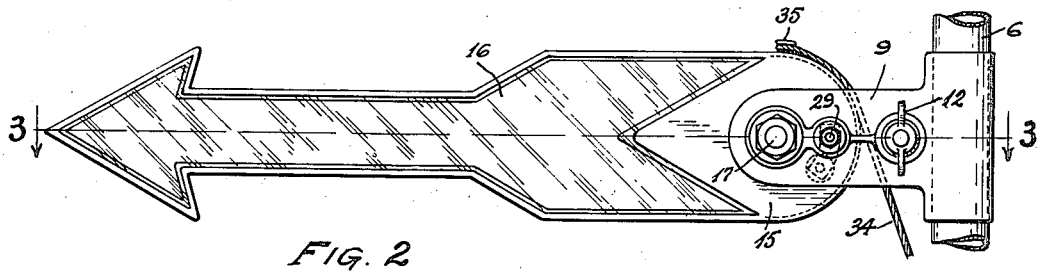
Fig. 2 is an enlarged fragmentary view in rearward elevation of the same.

Referring to the drawings, throughout which like reference numerals indicate like parts, attached to the front end portion of the body 5 of an automobile is secured the upright supports 6 and 7 which, in a well known manner serve to support a wind shield 8, the support 6 being on the left hand side and the support 7 being on the right hand side of the body 5.

To the support 6 is removably fastened a bracket 9 by means of a clamping member 10, a clamping bolt 11 and a winged nut 12, which bracket 9 is disposed to project horizontally in a line that is parallel with the plane of the wind shield 8.

Hinged to the outer end portion of the bracket 9 is a hollow semaphorical arm whose front side wall embodies a removable metal plate 13 and a glass plate 14.

The rearward side wall of said arm comprises an integral metal portion 15 and a glass plate 16, both glass plates 14 and 16 being formed to resemble an arrow whose barbed head is disposed at the free end of said arm.

Figure 3:
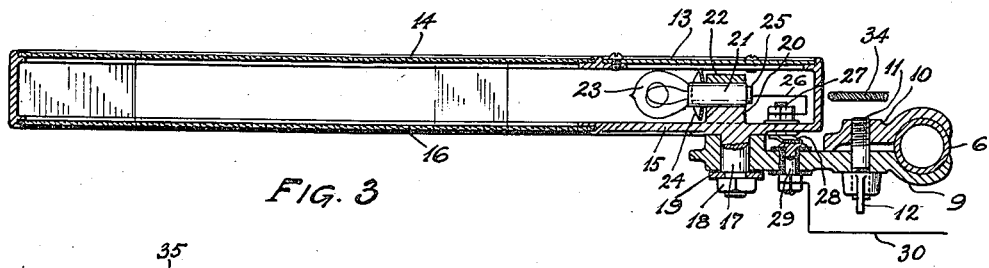
Fig. 3 is a view in longitudinal section on broken line 3, 3 of Fig. 2, showing parts of the same.
Figure 4:
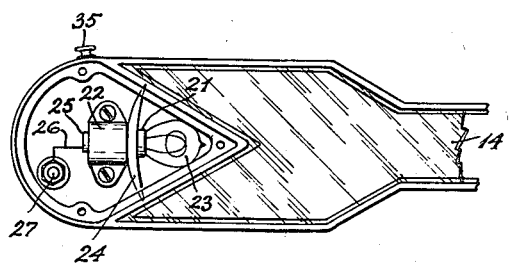
Fig. 4 is a fragmentary view in front elevation showing parts of the same.

The hinge, by which the semaphorical arm is articulated to the outer end portion of the bracket 9, comprises a cylindrical pivot stud 17 which is integral with, and projects from, the outer side surface of the metal portion 15 of the rearward side wall of said arm, and which extends through a bearing formed in the outer end portion of said bracket 9 to be rotatively movable therein, in which bearing it is maintained by a nut 18 and a washer 19, as more clearly shown in Fig. 3.

Projecting from the inner side of the metal portion 15 of the rearward side wall of the semaphorical arm is an integral lug 20 to which is clamped an incandescent electric lamp socket 21 by the means of a removable lamp socket clamping member 22; within which socket 21 is an electric lamp 23 which is provided with a reflector 24 that is disposed to reflect rays of light from said lamp 23 in a direction toward the barbed points of the glass plates 14 and 16 whereby the glass plates 14 and 16 will be illuminated when said lamp 23 is in operation.

The insulated terminal 25 of the lamp socket 21 is connected by a conductor 26 to an insulated stud 27 which extends to the exterior of the semaphorical arm through the metal portion 15 of its rearward side wall where it is provided with an electrical contact spring 28 that is adapted to engage and disengage with an insulated contact member 29 (that is fixed in the bracket 9) in response to swinging movements of said arm between its horizontal position and its vertical position, whereby when said arm is in its horizontal position then the lamp 23 will be lighted and when said arm is in its vertical position then said lamp 23 will be extinguished, the contact member 29 being connected by a conductor 30 with one terminal of a source of electricity, not shown, whose other terminal is in continuous metallic connection with the uninsulated terminal of the lamp socket 21.

Mounted on the dash board of the automobile 5, in a position to make it accessible to the operator, is a lever 31 which is pivotally attached to a bracket 32 and which is provided with a yielding detent 33 that may engage with said bracket 32 yieldingly to maintain said lever in a required angular position.

One end of a flexible cable 34 is connected to the lever 31 to extend therefrom to the semaphorical arm where its other end is connected to a stud 35 fixed in said arm, as shown in Fig. 1, thus operatively to connect said arm and said lever 31 in such manner that the operator may move the lever 31 toward the right hand to swing said arm to a horizontal position, and may move said lever 31 toward the left hand to permit said arm to fall by its own gravity and swing to its vertical position indicated by dotted lines in Fig. 1.

To operate my signaling device when it is associated with an automobile in the manner illustrated and described, when the operator desires to indicate that he is about to turn the automobile in its course toward the left hand he then actuates the lever 31 to swing it toward the right hand thus to cause the cable 34 to raise the semaphorical arm to a horizontal position shown by full lines in Fig. 1, in which position said arm will be maintained by the yielding detent 33 for a desired length of time whereupon the operator may then swing the lever 31 toward the left hand with the result that the cable 34 will be slackened to permit the semaphorical arm to fall downwardly by a swinging movement to the vertical position indicated by dotted lines in Fig. 1.

When the semaphorical arm is in its horizontal position the electric circuit of the lamp 23 will be completed thus to light said lamp, with the result that the arrow shaped glass side walls will be illuminated to display a light that may be seen by persons in front of the automobile and to display a light of a distinctive color that may be seen by persons in the rear of said automobile; and when said arm has fallen to its vertical position then the electric circuit of the lamp 23 will be broken to extinguish the lamp 23.

The circuit wire 30 may be provided with a manually operated switch, not shown, so that in daylight when the service of the lamp 23 is not required said switch may be actuated to open the circuit of the lamp 23 irrespective of the position of the semaphorical arm which in the day time can readily be seen when in its horizontal position without the aid of light from the lamp 23.

Obviously, changes may be made in the forms, dimensions and arrangement of parts of my invention without departing from the spirit thereof.

What I claim is:

A signal device for vehicles including a hollow arm having front and rear metallic plates at one end thereof and front and rear transparent plates in the remaining portions thereof, a supporting bracket, a pivot stud extending laterally from one side of one of said metallic plates and journaled transversely in said supporting bracket to swing upwardly and outwardly and downwardly and inwardly at one side of a vehicle, a second stud extending laterally from said plate inside of said arm, a lamp arranged longitudinally of said arm and secured to the second named stud, and means for swinging said arm.

In witnesses whereof, I hereunto subscribe my name this 21st day of February, A. D. 1917.

GEORGE BRAZEE.